(12) United States Patent
Delaney et al.

(10) Patent No.: US 9,910,619 B2
(45) Date of Patent: Mar. 6, 2018

(54) DUAL BUFFER SOLID STATE DRIVE

(71) Applicant: Toshiba Memory Corporation, Minato-ku, Tokyo (JP)

(72) Inventors: Christopher Delaney, Orange, CA (US); Gordon Waidhofer, Irvine, CA (US); Leland Thompson, Tustin, CA (US); Ali Aiouaz, San Jose, CA (US)

(73) Assignee: Toshiba Memory Corporation, Tokyo (JP)

( * ) Notice: Subject to any disclaimer, the term of this patent is extended or adjusted under 35 U.S.C. 154(b) by 0 days.

(21) Appl. No.: 14/976,793

(22) Filed: Dec. 21, 2015

(65) Prior Publication Data

US 2017/0177233 A1    Jun. 22, 2017

(51) Int. Cl.
*G06F 12/00* (2006.01)
*G06F 3/06* (2006.01)
*G06F 12/0804* (2016.01)

(52) U.S. Cl.
CPC ............ *G06F 3/065* (2013.01); *G06F 3/0619* (2013.01); *G06F 3/0685* (2013.01); *G06F 12/0804* (2013.01); *G06F 2212/1032* (2013.01); *G06F 2212/2022* (2013.01); *G06F 2212/60* (2013.01)

(58) Field of Classification Search
CPC ...... G06F 12/00; G06F 12/08; G06F 12/0238; G06F 12/0246; G06F 3/0679
USPC .......................................... 711/100.103, 154
See application file for complete search history.

(56) References Cited

U.S. PATENT DOCUMENTS

| | | | |
|---|---|---|---|
| 2002/0133735 A1 | 9/2002 | McKean et al. | |
| 2003/0037207 A1 | 2/2003 | Aigo | |
| 2012/0017033 A1* | 1/2012 | Moritoki | G06F 11/1441 711/103 |
| 2012/0124294 A1 | 5/2012 | Atkisson et al. | |
| 2014/0108703 A1* | 4/2014 | Cohen | G06F 3/0616 711/103 |
| 2014/0297918 A1 | 10/2014 | Lee et al. | |
| 2015/0370713 A1 | 12/2015 | Morishita et al. | |

* cited by examiner

*Primary Examiner* — Tuan Thai
(74) *Attorney, Agent, or Firm* — White & Case LLP (57) ABSTRACT

A solid state drive includes a dual buffer for buffering incoming write data prior to committal to a non-volatile memory. The buffer is operated to provide a temporary backup of dirty data pending successful completion of a host transfer. The dual buffer may be operated as a primary buffer and a secondary buffer. The primary buffer may be used as the default buffer during normal operation. The secondary buffer is written to during a host transfer that is a cache write to dirty data. A copying process may be used to copy data between the primary and the secondary buffer to preserve the backup data pending successful completion of the host transfer.

13 Claims, 7 Drawing Sheets

DUAL BUFFER SOLID STATE DRIVE

FIELD OF THE INVENTION

An embodiment of the present invention is generally related to techniques to buffer host data in a solid state drive prior to writing the data to a non-volatile memory. More specifically, an embodiment is directed to utilizing a dual buffer to improve data integrity and performance

BACKGROUND OF THE INVENTION

A Solid State Drive (SSD) typically includes a volatile buffer to buffer data from the host computer system prior to committing the write data to a non-volatile memory, such as a flash memory array. In a write back cache implementation of a SSD, the volatile buffer acts as a cache memory where data is always first written to the cache, and only later propagated to the flash memory.

A host typically makes requests in multiples of a logical block, which has a size that is small relative to a physical page of flash memory. For example, a logical block may have a size of 512 bytes. A physical page of flash memory typically has a much larger size, such as a 4K physical page, although a larger page size is also sometimes used. The volatile buffer permits incoming units of host data to be aggregated and written in larger data units (e.g., a page size) to the flash memory.

Typically a flash translation layer (FTL) is provided to emulate a traditional disk storage device that has a block device interface. The FTL manages logical-to-physical device mapping information to provide a block device interface to the host. Logical block addresses are converted by the FTL to logical flash page addresses and further to physical page addresses.

Modern FTLs in enterprise SSDs often implement a 4K design, in that the smallest unit of host data that can be localized on the solid state drive is 4 kilobytes (henceforth referred to as a 4K FTL, and a FTL slice). Such a FTL slice may represent only a small portion of a total page size. For example, many flash designs, implement a page size (where a page size is a smallest programmable unit) of 16K or larger (e.g. 32K for a multi-plane write). Thus, to efficiently utilize a flash page, the FTL must buffer data that the host has written in a volatile memory buffer until sufficient data has been aggregated to commit a full flash page.

This presents a challenge to the FTL in terms of a tradeoff between performance and data integrity. Consider the situation of so-called dirty data ('dirty data' being a term used to refer to data in a cache memory which has been changed or modified but where this change has not yet been propagated to main memory, which in an SSD would be the non-volatile flash memory array). For example, there may be a sequence of host write commands directed to the same cache location such that the host may attempt to overwrite dirty data in the cache. Suppose that a host write command arrives and the host writes all or part of the same FTL slice while data is still being buffered in volatile memory. In this situation, suppose that there is no non-volatile copy of the data stored when a second host command arrives. In this situation the host is attempting to overwrite dirty data in the cache.

There are a few common options used in the industry for the FTL to handle the situation of dirty data. The first approach is to transfer the data onto the same buffer location. This approach has the benefit of being the most efficient in terms of latency, but potentially compromises the integrity of host data. However, this loss of data integrity is deemed unacceptable in many applications. The second approach is to flush the dirty data to media (i.e., to the flash memory) before accepting the new host data. This approach has the benefit of ensuring the integrity of host data, but introduces inconsistent command latencies and is an inefficient use of flash.

Consider the following scenario in which there are three versions of host data "A." A is the oldest copy that is safely stored in non-volatile storage, A' is the data written by the host that is dirty and buffered in volatile memory, and A" is the data written over A' before A' has been committed to non-volatile media. There are two common options employed to respond this scenario, each of which has significant problems. The two options result in a choice between ensuring the integrity of dirty data or maintaining host performance First, one option is that the FTL can transfer A" into the same volatile buffer location where the current dirty data A' resides. This is the most efficient approach, but runs the risk of corrupting A' if the transfer of A" experiences an error. If an error occurs, A' has now been corrupted and must be discarded. In this situation, the host would expect the SSD to return A' on a read, but instead would receive A because A' no longer exists.

Second, another option is that the FTL can flush A' out to media (i.e., the flash memory) before initiating the transfer of A". However, the buffer location for the data may correspond to an individual slice, such as a 4K slice in a buffer sized to aggregate a full page of data. If the flush is performed without aggregating an entire page, it results in inefficient operation. Moreover, this is a very inefficient approach because the command for A" must now wait for a complete page program before the transfer can begin. While this second solution ensures data integrity, it also creates command latency spikes which are unacceptable for enterprise computer system applications. Further, this results in an inefficient use of flash because a full page must be written for potentially only a single FTL slice (e.g., 4K) worth of data.

SUMMARY OF THE INVENTION

A solid state drive has a flash controller that supports operating a volatile memory buffer to utilize a portion of the buffer to provide a temporary backup of dirty data pending successful completion of a host transfer. In one embodiment, a volatile memory is organized into a primary buffer and a secondary buffer. A primary buffer may be used as the default buffer during normal operation. A secondary buffer is written to during a host transfer that is a cache write to dirty data.

One embodiment of a method of operating a solid state drive includes a method of operating a solid state drive includes receiving host write commands to write data to a non-volatile memory array. Incoming write commands are buffered in a volatile memory buffer sized to aggregate write data into a larger size unit for committal to the non-volatile memory. Dirty data is protected in the buffer during an attempted host write by using at least a portion of the buffer to protect dirty data when the host write corresponds to an attempted overwrite of the dirty data, where the dirty data is data not yet committed to the non-volatile memory array.

A method of performing cache management for write data in a Flash Memory Controller of a Solid State Drive having a Flash Translation Layer (FTL includes maintaining, by the FTL, a cache of buffered writes. Two memory pages are allocated, by the FTL, for each cache entry in the cache, the two memory ranges corresponding to a primary buffer and a secondary buffer. The address of a host write access request is determined as well as whether or not the host write access request is a cache hit corresponding to an attempted overwrite of dirty data. In response to detecting an incoming host write access request that would overwrite buffered data that has not been committed to a non-volatile memory array, at least one of the primary buffer and the secondary volatile memory buffer is utilized as a backup buffer to protect dirty data pending successful completion of the incoming write command, where the dirty data is buffered data not yet committed to the non-volatile memory array.

In one embodiment, a solid state drive includes a solid state drive controller. The solid state driver controller is configured to receive host write commands to write data to a non-volatile memory array, buffer incoming write data for received host write commands in a volatile memory buffer prior to committal to the non-volatile memory array, and protect dirty data in the volatile memory buffer during an attempted host write by using at least a portion of the buffer to protect dirty data when the attempted host write corresponds to an attempted overwrite of the dirty data, wherein the dirty data is buffered data not yet committed to the non-volatile memory array.

DETAILED DESCRIPTION

Figure 1:
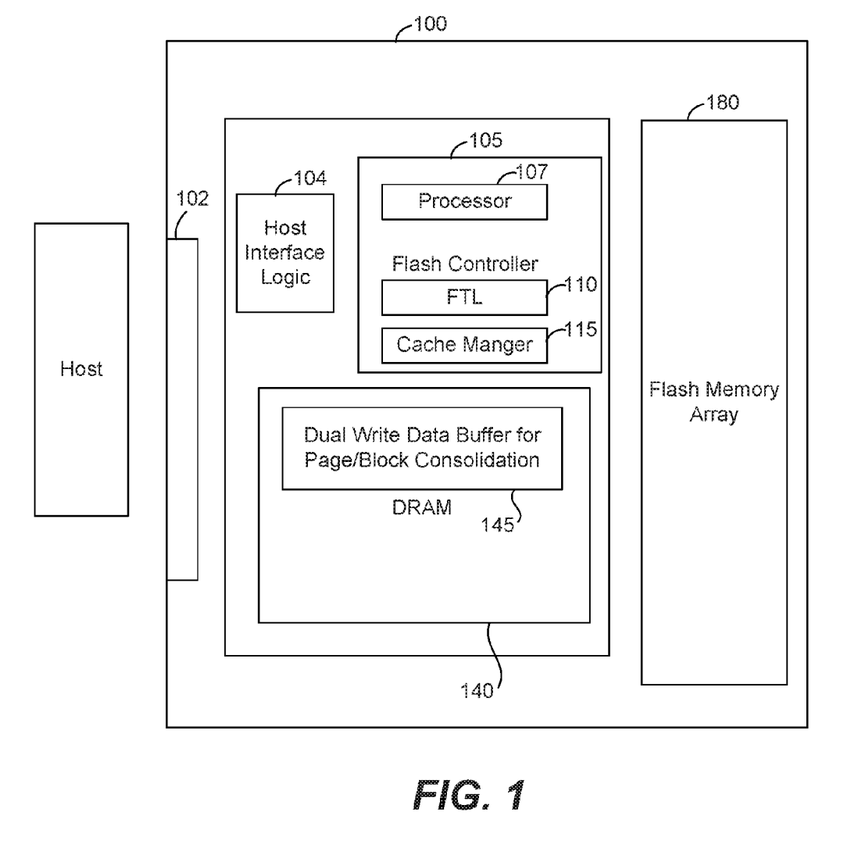
FIG. 1 illustrates a solid state drive with a dual buffer in accordance with an embodiment.

FIG. 1 illustrates a Solid State Drive (SSD) 100 in accordance with an embodiment. The SSD includes a flash controller 105 and non-volatile memory, which in one implementation is a flash memory array 180. The flash controller 105 includes a processor 107, associated internal memory, and in one embodiment includes firmware (not shown in FIG. 1). A host interface 102 and Host Interface Layer (HIL) 104 provides an interface and associated logic to interface with an external host.

Flash Translation Layer (FTL) 110 is provided, which may include associated logical to physical (L2P) tables and a cache manager 115 to manage the use of a dual buffer 145. The flash controller 105 may include additional logic to manage host writes, such as direct memory access (DMA) writes.

A DRAM or other volatile memory 140 is provided to buffer data under the control of the cache manager 115. The dual buffer 145 is provided for the FTL to buffer write data for page/block consolidation before committing the write data to the non-volatile flash memory array 180. The dual buffer 145 is sized to aggregate a number of FTL slices corresponding to a flash memory page. As a non-limiting example, if the FTL slice size is 4K and the flash page size is 16K, then the buffer is sized to aggregate at least four 4K slices. Thus the cache manager 115 acts in coordination with the FTL to attempt to efficiently aggregate FTL slices in the dual buffer 145 and schedule their commitment into the flash memory array 180.

Figure 2:
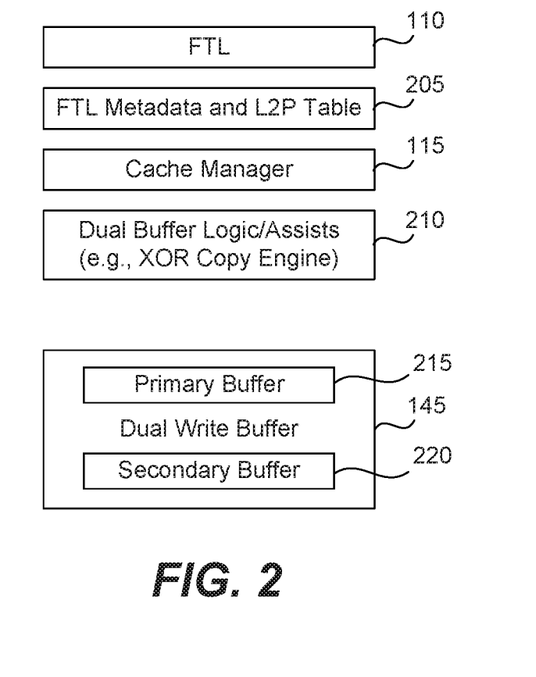
FIG. 2 illustrates aspects of the dual buffer of FIG. 1 in accordance with an embodiment.

FIG. 2 illustrates additional aspects of the FTL operation in accordance with an embodiment. The FTL 110 may include FTL metadata and a logical to physical (L2P) table 205. The cache manger 115 may include logic or firmware assists 210 to aid in implementing a dual buffer. In one embodiment a copy engine, based on XOR copying, is provided to copy data between the two different buffers.

The dual buffer 145 has a primary buffer 215 and a secondary buffer 220. While in principal two separate buffer memories may be used, in practice the dual buffering may be achieved using two memory ranges within one memory. As an example, in one embodiment the FTL allocates two memory ranges for each cache entry slot in the write buffer 145. When the command for a memory location A" arrives, the transfer can occur into the secondary buffer 220, ensuring the integrity of A' in the primary buffer 215. If the transfer completes successfully, the secondary buffer 220 now contains the most up-to-date copy of the host data and can be written to flash when a full page is available to be committed to the flash memory array. However, if the transfer fails, the primary buffer 215 still contains A' and can be written as scheduled.

By implementing two memory buffers 215, 220 for each cache entry, the host transfer can occur into one buffer, while the dirty data is held in the other. The dirty data is maintained pending a successful transfer. Using this mechanism, host performance is constant and data integrity maintained by limiting the impact of transfer errors to only one buffer instance.

Figure 3:
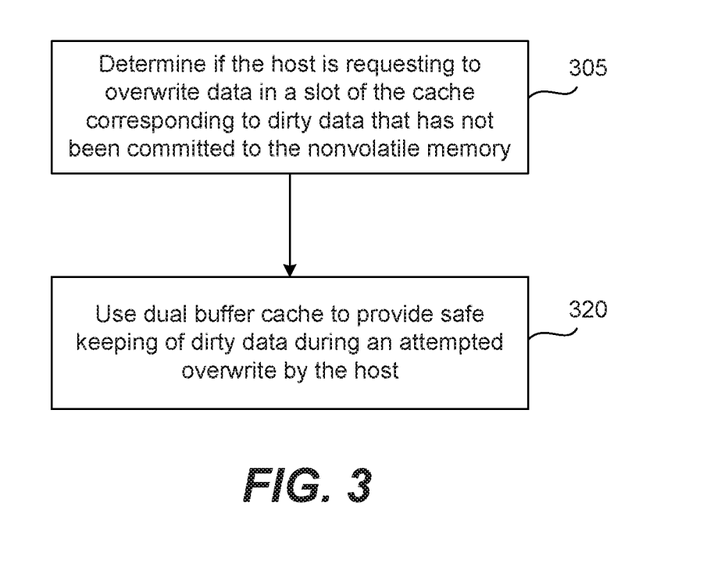
FIG. 3 is a flowchart of a method in accordance with an embodiment.

FIG. 3 is a flowchart of a method in accordance with an embodiment. A determination is made 305 that the host is requesting to overwrite data in a slot of the cache corresponding to dirty data that has not been committed to the nonvolatile memory. At least one of the buffers of the dual buffer of the cache is used 320 to provide safe keeping of dirty data during an attempted overwrite by the host. That is, at least one of the buffers is used to provide a temporary backup of the dirty data while an attempt is made to complete the host transfer to the other buffer.

The management of the dual buffer cache may be implemented in different ways and employ a flag system to track the location of data and manage the operation of the cache. However, it is desirable to operate the dual buffer cache in a manner that minimizes computational cost, latency, and lookup costs.

In one embodiment, each host sector (or group of sectors when the host sector size is less than the FTL slice size) exists in one, and only one, location in the cache (i.e. the associativity is not specified, but once a sector is in cache, it can only be in one cache entry at a time). This allows for efficient lookups and minimal latency on host accesses. For each cache entry, two memory regions are allocated to hold host data as the primary buffer and the secondary buffer.

Figure 4:
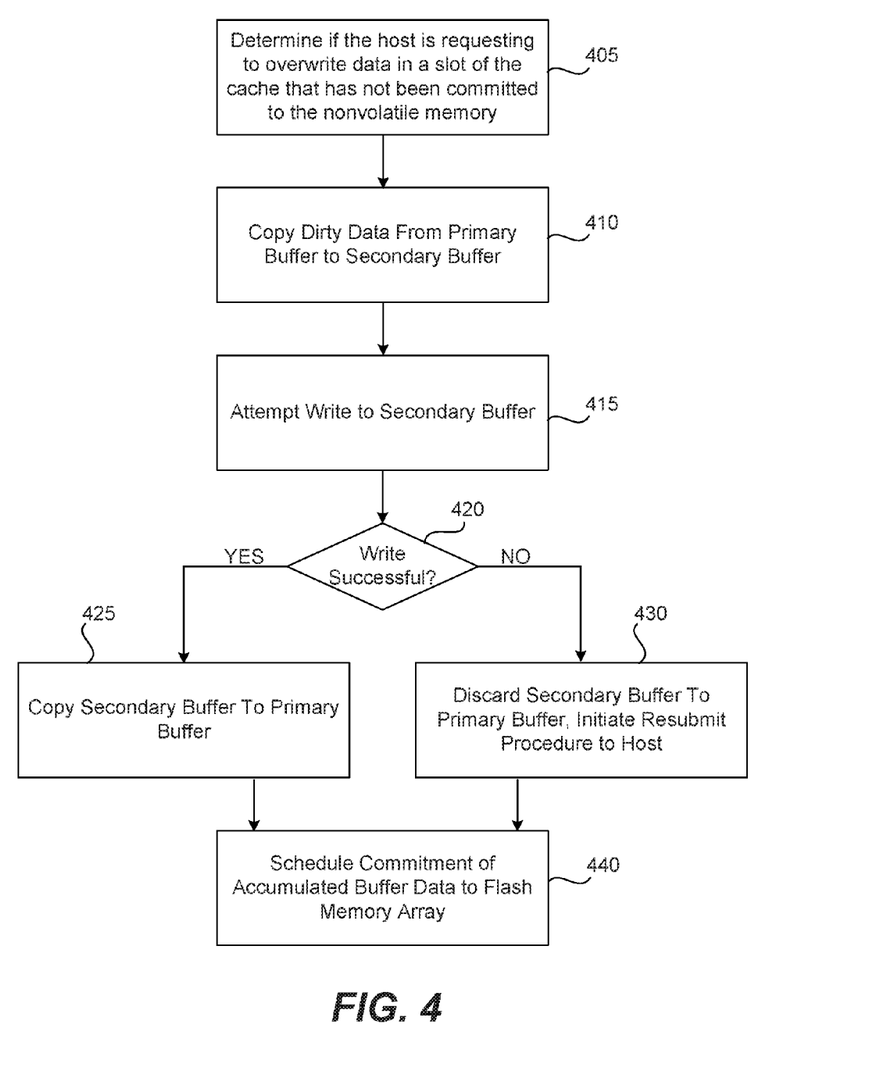
FIG. 4 is a flowchart of a method in accordance with an embodiment.

FIG. 4 is a flowchart of a method in accordance with an embodiment. In one embodiment, a series of default rules are used to efficiently protect dirty data and minimize computational costs. In one implementation, a default rule is to write incoming host data to a primary buffer unless the primary buffer holds dirty data. A determination is made 405 if the host is requesting to overwrite data in a slot of the cache that has not been committed to the nonvolatile memory. Dirty data is copied 410 from the primary buffer to the secondary buffer. The write is then attempted 415 to the secondary buffer. If the write is successful, the secondary buffer is copied back to the primary buffer. If the write is unsuccessful, the secondary buffer is discarded. In the event of an unsuccessful transfer, a resubmit procedure may be implemented to indicate to the host that the data needs to be resubmitted. When the buffer is full, the commitment of the accumulated buffer data to flash is scheduled 440.

The embodiment of FIG. 4 ensures the integrity of host data and only introduces a minimal latency overhead of a copy step from the primary to the secondary buffer. But this latency is drastically shorter than a flash page program, especially if the SSD controller has a hardware assist, such as XOR copying, to copy memory from one location to another, allowing the processor to complete other tasks while the memory is copied.

The method may be applied to writing entire FTL slices (e.g., a 4K FTL slice). However, it may also be extended to the case in which the host is writing partial FTL slices (i.e. in a 4K FTL with a host format of 512 B, where only a subset of the 8 sectors in the FTL slice is being written). Consider now an example in which either full FTL slices or partial FTL slices are written. In this example the default rule is that in normal operation all host transfers occur into and out-of the primary buffer. This is the least expensive in terms of computation. However, the exception is when a host write occurs and the FTL determines that the address of the access is already in cache (a cache hit), AND that the data stored in the cache is dirty. For this exception case, the following steps occur.

1) If the host is writing the entire 4K FTL slice, the host transfer can immediately be started into the secondary buffer, and processing skips to step 3.

2) If only a portion of the 4K FTL slice is being written, the FTL initiates a copy of the primary buffer to the secondary buffer. This step is most efficiently implemented with a hardware assist, but could be done by the processor as well. Once the copy completes, the host transfer can then be started into the secondary buffer.

3) If the host transfer to the secondary buffer completes successfully, the secondary buffer is now the active buffer and host accesses and flash committal occur from that buffer.

4) If the host transfer to the secondary buffer fails, the host command is aborted and the primary buffer is still the active buffer for both host accesses and flash committal.

Figure 5:
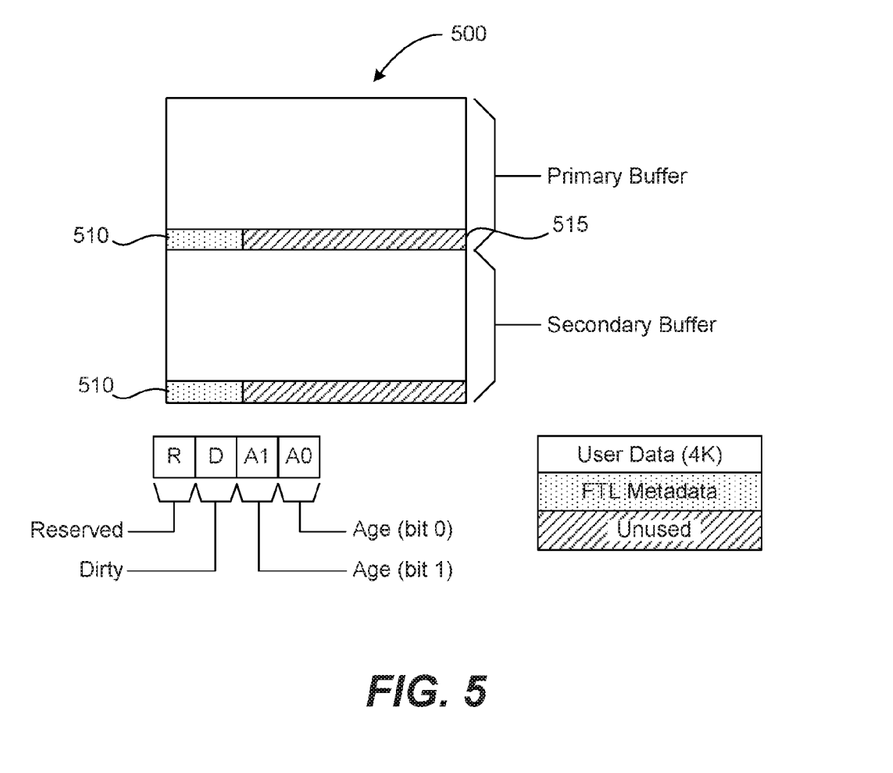
FIG. 5 illustrates a dual buffer data structure in accordance with an embodiment.

The dual buffer approach is compatible with conventional DMA memory accesses and cache operations of a volatile buffer such as read, write, etc. FIG. 5 illustrates a non-limiting example of a dual buffer cache entry 500 and FIGS. 6-11 illustrate a range of read and write operations for the dual buffer of FIG. 5.

Referring to FIG. 5, in one embodiment, for each cache entry, the primary buffer is one data frame in size (e.g., a user data of 4K in size for a 4K FTL slice). In one implementation FTL metadata 510 is also present. Room may also be provided for other metadata in an unused portion 515. In one embodiment the FTL metadata 510 includes, as an example, 4 bits corresponding to a reserved bit, a dirty bit, and two age bits. The secondary buffer has a similar data structure that is one data frame in size and includes a FTL metadata section 510.

In one embodiment, the FTL metadata 510 corresponds to cache flags used by the cache manager of the FTL. A cache flag value of 0 is a cleared/negated false condition, and a 1 is a set/asserted true flag. The Reserved R bit may correspond to a cache flag to indicate whether a slice was successfully locked in the cache. A cache flag in the Reserved R field shown with X in FIGS. 6 to 10 is interpreted to mean the value is unchanged from the previous state. In one embodiment a failure during the lock phase results in a resubmit response back to the host.

Figure 6:
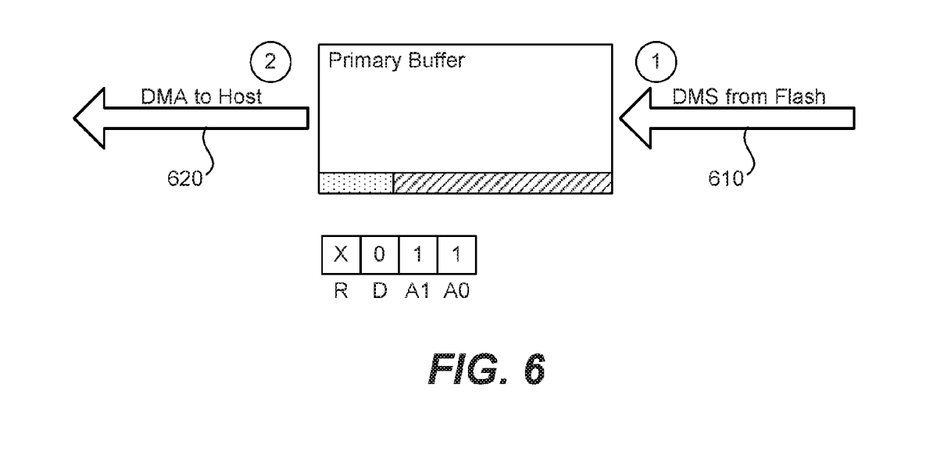
FIG. 6 illustrates an example of a cache read command and a cache miss for the cache buffer structure of FIG. 5.

FIG. 6 illustrates an example of a cache read command and a cache miss for the cache buffer structure of FIG. 5. A logical to physical (L2P) lookup is performed to determine the location of the slice on the physical flash media. Each slice is referred to by a unique slice index, which is a combination of the Namespace number (an SSD may be split up into a number of addressable units called Namespaces) and the slice number within the Namespace, or <Namespace,Slice>. A DMA transfer 610 from the flash memory array to the primary buffer is performed. A Flash Read Layer (FRL) performs the read, forwarding the request to a Flash Read Manager (FRM) if there is a failure. The FTL metadata is verified to match the requested slice index <Namespace, Slice>. The slice data is transferred from the primary buffer to the host via a HIL DMA transfer 620.

Figure 7:
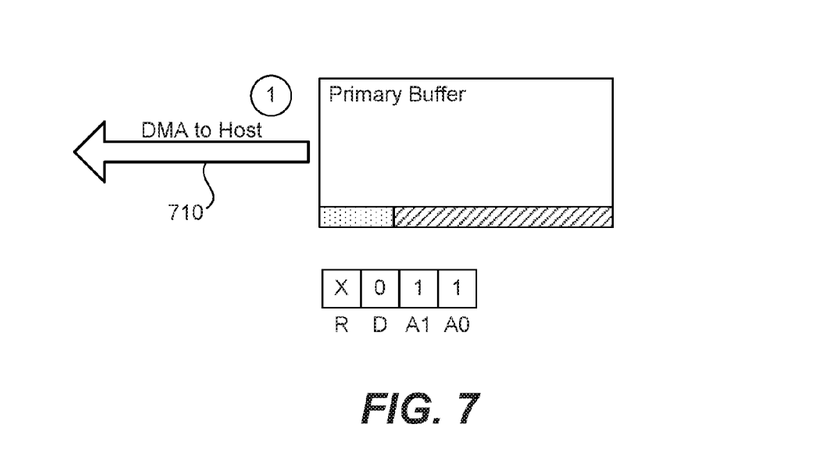
FIG. 7 illustrates an example of a cache read command and a cache hit for the cache buffer structure of FIG. 5.

FIG. 7 illustrates an example of a cache read command and a cache hit for the cache buffer structure of FIG. 5. In this example, the FTL metadata is verified to match the requested slice index <Namespace, Slice>. The slice data is transferred from the primary buffer to the host via a HIL DMA transfer 710.

Figure 8:
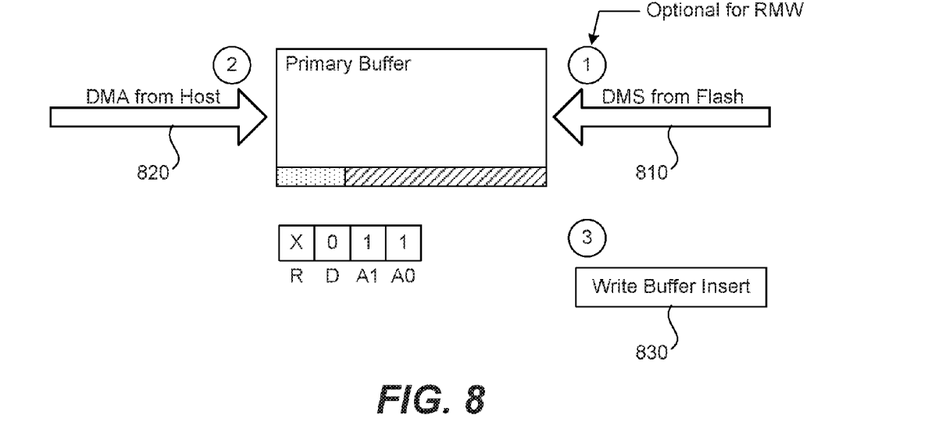
FIG. 8 illustrates an example of a cache write command for the cache buffer structure of FIG. 5 when there is a cache miss.

FIG. 8 illustrates an example of a cache write command for the cache buffer structure of FIG. 5 when there is a cache miss. A L2P lookup is used to determine a location of the slice on the physical flash media. If only a portion of a 4K slice is being written, the HIL will request a read-modify-write 810. If true, the FRL performs the read, forwarding the request to FRM in the event of a failure. The FTL metadata is verified to match the requested slice index <Namespace, Slice>. The slice data is transferred to the primary buffer from the host via a HIL DMA transfer 820. The FTL metadata is updated to reflect new information from the host. The slice that is written may be scheduled for committal to non-volatile memory by writing it to the current write buffer 830.

Figure 9:
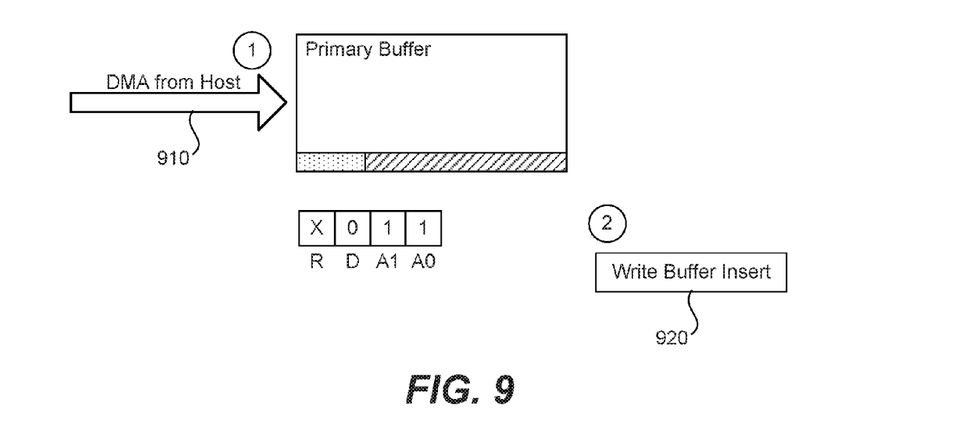
FIG. 9 illustrates an example of a cache write command for the cache buffer structure of FIG. 5 when there is a cache hit that does not correspond to dirty data.

FIG. 9 illustrates an example of a cache write command for the cache buffer structure of FIG. 5 when there is a cache hit that does not correspond to dirty data. A L2P lookup is performed to determine the location of the slice on the physical flash media. If only a portion of the 4K slice is being written, the HIL will request a read-modify-write. If true, the read is skipped because the cache hit guarantees that the current data is already in the cache. The FTL metadata is verified to match the requested slice index <Namespace, Slice>. The slice data is then transferred to the primary buffer from the host via a HIL DMA transfer 910. The FTL metadata is updated to reflect new information from the host. The slice that is written may be scheduled for committal to non-volatile memory by writing it to the current write buffer 920.

Figure 10:
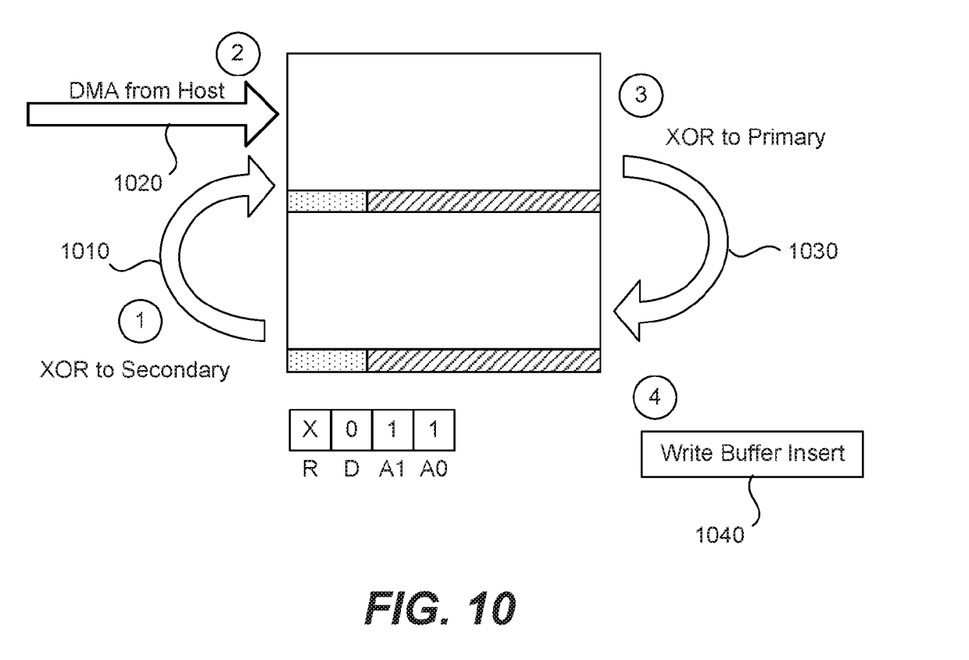
FIG. 10 illustrates an example of a cache command write and a cache hit for dirty data for the cache buffer structure of FIG. 5.

FIG. 10 illustrates an example of a cache command write and a cache hit for dirty data for the cache buffer structure of FIG. 5. A L2P lookup is performed to determine the location of the slice on the physical flash media. The FTL metadata is verified to match the requested slice index <Namespace, Slice>. The primary buffer is copied 1010 to the secondary buffer. The slice data is transferred to the secondary buffer from the host via an HIL DMA transfer 1020. The secondary buffer is transferred back to the primary buffer 1030 upon a successful HIL transfer. A barrier is present to ensure any FIL DMA transfer operations have completed before the secondary buffer is transferred to the primary buffer. The FTL metadata is updated to reflect new information from the host. The slice is scheduled for committal to non-volatile memory by writing it to the current write buffer 1040.

While the invention has been described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. The present invention may be practiced without some or all of these specific details. In addition, well known features may not have been described in detail to avoid unnecessarily obscuring the invention. In accordance with the present invention, the components, process steps, and/or data structures may be implemented using various types of operating systems, programming languages, computing platforms, computer programs, and/or computing devices. In addition, those of ordinary skill in the art will recognize that devices such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

What is claimed is:

1. A method of performing cache management for write data in a Flash Memory Controller of a Solid State Drive having a Flash Translation Layer (FTL), the method comprising:
    maintaining, by the FTL, a cache of one or more buffered write commands;
    allocating, by the FTL, two memory ranges for each cache entry in the cache, the two memory ranges corresponding to a primary buffer and a secondary buffer;
    in response to the Flash Memory Controller receiving a write command, determining a target address of the write command, and whether the write command will cause a cache hit corresponding to an attempted overwrite of dirty data in the primary buffer;
    performing host transfers into and out of the primary buffer except when it is determined that the write command will cause the cache hit corresponding to the attempted overwrite of the dirty data in the primary buffer; and
    in response to determining that the write command will cause the cache hit corresponding to the attempted overwrite of the dirty data in the primary buffer, (i) copying the dirty data in the primary buffer to the secondary buffer, and (ii) writing the write data corresponding to the write command to the secondary buffer;
    wherein the cache is sized to aggregate data write commands having a cumulative size corresponding to a page of flash memory and the method further comprises the step of scheduling commitment of contents of the primary buffer into the flash memory.

2. The method of claim 1, wherein in response to successfully writing the write data corresponding to the write command to the secondary buffer, copying the secondary buffer back to the primary buffer.

3. The method of claim 1, wherein in response to unsuccessfully writing the write data corresponding to the write command to the secondary buffer, discarding the secondary buffer.

4. A method of performing cache management for write data in a Flash Memory Controller of a Solid State Drive having a Flash Translation Layer (FTL), the method comprising:
    receiving, from a host, a write command and write data to be written to a non-volatile memory;
    maintaining, by the FTL, a cache of one or more write commands;
    allocating, by the FTL, a first memory range and a second memory range for each cache entry in the cache;
    determining whether the write command is attempting to overwrite dirty data residing in a first memory range;
    in response to determining that the write command is not attempting to overwrite dirty data in the first memory range, writing the data to the first memory range;
    in response to determining that the write command is attempting to overwrite dirty data, copying the dirty data from the first memory range to a second memory range; and
    after the dirty data is copied to the second memory range, writing the write data received from the host to the second memory range;
    wherein the first memory range and second memory range are each sized to aggregate data writes having a cumulative size corresponding to a page of flash memory and the method further comprises scheduling commitment of contents of the first memory range into the flash memory.

5. The method of claim 4, further comprising the step of determining whether the write data was successfully written to the second memory range.

6. The method of claim 5, further comprising the step of copying the contents of the second memory range back to the first memory range in response to determining that the write data was written successfully to the second memory range.

7. The method of claim 5, further comprising the step of discarding the contents of the second memory range in response to determining that the write data was not successfully written to the second memory range.

8. The method of claim 7, further comprising the step of initiating a resubmit procedure request with the host in response to discarding the contents of the second memory range.

9. A method of performing cache management for write data in a Flash Memory Controller of a Solid State Drive having a Flash Translation Layer (FTL), the method comprising:
    storing, within a volatile primary buffer, one or more cache entries, each cache entry corresponding to write data to be written to a non-volatile memory;
    allocating, by the FTL, two memory ranges for each cache entry, the two memory ranges corresponding to the volatile primary buffer and a volatile secondary buffer, each of the two memory ranges further subdivided into FTL slices;

in response to receiving a host write command to write data to the non-volatile memory, storing the write data to the volatile primary buffer, except in a situation where the FTL determines a cache hit and the volatile primary buffer contains dirty data, in said situation:

determining whether the write data is for an entire FTL slice or whether the write data is for a partial FTL slice, in response to the write data being a partial FTL slice, initiating, by the FTL, a copy of the primary buffer to the secondary buffer, and then writing the write data into the secondary buffer, and in response to the write data being a full FTL slice, writing the write data into the secondary buffer without copying the contents of the primary buffer to the secondary buffer;

wherein the cache entry is sized to aggregate data write commands having a cumulative size corresponding to a page of flash memory and the method further comprises the step of scheduling commitment of contents of the primary buffer into the flash memory.

10. The method of claim 9, further comprising the step of, in response to determining that the write data was written into the secondary buffer successfully, using the secondary buffer as an active buffer for both host accesses and flash commital.

11. The method of claim 9, further comprising the step of, in response to determining that the write data was written into the secondary buffer successfully, copying the contents of the secondary buffer to the primary buffer and using the primary buffer as an active buffer for both host accesses and flash commital.

12. The method of claim 9, further comprising the step of aborting the host write command and maintaining the use of the primary buffer as the active buffer for both host accesses and flash commital in response to determining that the writing of the write data into the secondary buffer failed.

13. The method of claim 9, wherein the address of the dirty data corresponds with the access address of the write data.

* * * * *